United States Patent
Mita

(10) Patent No.: US 11,115,129 B2
(45) Date of Patent: Sep. 7, 2021

(54) OPTICAL RECEIVER, OPTICAL TERMINAL, AND OPTICAL COMMUNICATION SYSTEM

(71) Applicant: Mitsubishi Electric Corporation, Tokyo (JP)

(72) Inventor: Daisuke Mita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 74 days.

(21) Appl. No.: 16/500,060

(22) PCT Filed: Apr. 7, 2017

(86) PCT No.: PCT/JP2017/014490
§ 371 (c)(1),
(2) Date: Oct. 1, 2019

(87) PCT Pub. No.: WO2018/185926
PCT Pub. Date: Oct. 11, 2018

(65) Prior Publication Data
US 2021/0099235 A1  Apr. 1, 2021

(51) Int. Cl.
*H04B 10/06* (2006.01)
*H04B 10/69* (2013.01)
*H04B 10/272* (2013.01)

(52) U.S. Cl.
CPC .......... *H04B 10/69* (2013.01); *H04B 10/272* (2013.01)

(58) Field of Classification Search
CPC ...... H04B 10/69; H04B 10/272; H04B 10/60; H04B 10/693; H04B 10/695; H04B 10/66; H04L 25/061; G02F 1/0123; G02F 1/2255; G02F 1/225

USPC .................. 398/202, 203, 204, 208, 164, 66
See application file for complete search history.

(56) References Cited

U.S. PATENT DOCUMENTS

| | | | |
|---|---|---|---|
| 10,003,410 B2 | 6/2018 | Mita | |
| 2007/0122163 A1* | 5/2007 | Dalton | H04B 10/27 398/208 |
| 2017/0338780 A1* | 11/2017 | Bajwa | H04B 10/503 |

FOREIGN PATENT DOCUMENTS

| | | |
|---|---|---|
| JP | 4-342315 A | 8/2009 |
| JP | 2009-177577 A | 8/2009 |
| WO | WO 2016/035374 A1 | 3/2016 |

* cited by examiner

*Primary Examiner* — Hibret A Woldekidan
(74) *Attorney, Agent, or Firm* — Birch, Stewart, Kolasch & Birch, LLP

(57) ABSTRACT

An optical receiver includes: a pre-amplifier to convert a current signal into a voltage signal; an LIA to amplify and limit an amplitude of the voltage signal; a transmission line connecting the pre-amplifier with the LIA; an AC coupling capacitor inserted in the middle of the transmission line or at an end of the transmission line; a termination circuit connected with the transmission line, for switching to a first resistance or a second resistance higher than the first resistance in response to a switching signal; and an AC load connected with the transmission line. The AC load is open in a low-frequency range of the voltage signal and having a resistance enabling impedance matching with the pre-amplifier and the transmission line in a high-frequency range of the voltage signal, wherein the termination circuit and the AC load are electrically connected in parallel.

18 Claims, 3 Drawing Sheets

OPTICAL RECEIVER, OPTICAL TERMINAL, AND OPTICAL COMMUNICATION SYSTEM

FIELD

The present invention relates to an optical receiver that receives optical signals, an optical terminal including the optical receiver, and an optical communication system including the optical terminal.

BACKGROUND

In recent years, among access networks for providing multimedia services to homes, point-to-multipoint access optical communication systems called passive optical network (PON) systems provided by public networks using optical fibers have been widely used. A PON system includes: one optical line terminal (hereinafter referred to as an OLT), which is an optical terminal of a station side device; and a plurality of optical network units (hereinafter referred to as ONUs), which are subscriber side terminal devices connected with the OLT via optical star couplers. The reception level of an optical signal that the OLT receives from each of the ONUs is dependent on the distance between the ONU that is the transmission source of the optical signal and the OLT, and the distances between the OLT and the ONUs typically vary depending on each of the ONUs. The optical receiver used in the OLT therefore needs to stably reproduce packets of different reception levels.

A packet transmitted from an ONU contains, in a leading portion thereof, specific bits called a preamble, which is used for synchronization. In a PON system, because the other ONUs cannot transmit a packet while an ONU is transmitting a packet, synchronization therefore needs to be performed with short preambles and the subsequent payload is then received in order to increase the transmission efficiency. Thus, high-speed burst reception characteristics that bring a signal to a reproducible state at high speed with a short preamble are required of the optical receiver used in the OLT. Furthermore, high consecutive identical digit immunity enabling stable reception of consecutive bits of identical digits present in a payload is also required of the optical receiver used in the OLT. The burst reception characteristics and the consecutive identical digit immunity are, however, in the relation of trade-off.

Patent Literature 1 teaches a technology for achieving high-speed burst reception characteristics and high consecutive identical digit immunity in a burst signal reception circuit by arranging capacitors having different low-pass cut-off frequencies in parallel on transmission paths between an amplifier and a comparator, so that an output of the amplifier passes through the capacitor with a high low-pass cut-off frequency during the preamble section of a burst signal and through the capacitor with a low low-pass cut-off frequency during the payload section of the burst signal.

CITATION LIST

Patent Literature

Patent Literature 1: Japanese Patent Application Laid-open No. H04-342315

SUMMARY

Technical Problem

According to the above technology of the related art, a switch is inserted between the transmission paths to switch between the transmission paths. Thus, in a case where transmission of radio-frequency signals on the order of 10 Gbps is assumed, a problem lies in that the quality of waveforms of radio-frequency signals is degraded by reflection loss and insertion loss caused by switching.

The present invention has been made in view of the above, and an object thereof is to provide an optical receiver that achieves good burst reception characteristics and consecutive identical digit immunity while preventing degradation in the quality of signal waveforms.

Solution to Problem

To solve the aforementioned problems and achieve the object, an optical receiver according to the present invention includes: a pre-amplifier that converts a current signal, into which an input optical signal is converted, into a voltage signal; a limiting amplifier that amplifies and limits an amplitude of the voltage signal; a transmission line connecting the pre-amplifier with the limiting amplifier; and an alternating current coupling capacitor inserted in the middle of the transmission line or at an end of the transmission line. The optical receiver also includes a termination circuit connected with the transmission line, for switching to a first resistance or a second resistance higher than the first resistance in response to a switching signal. The optical receiver also includes an alternating current load connected with the transmission line, the alternating current load being open in a low-frequency range of the voltage signal and having a resistance enabling impedance matching with the pre-amplifier and the transmission line in a high-frequency range of the voltage signal. In the optical receiver, the termination circuit and the alternating current load are electrically connected in parallel.

Advantageous Effects of Invention

An optical receiver according to the present invention produces effects of achieving good burst reception characteristics and consecutive identical digit immunity while preventing degradation in the quality of signal waveforms.

DESCRIPTION OF EMBODIMENTS

An optical receiver, an optical terminal, and an optical communication system according to the embodiments of the present invention will be described in detail below with reference to the drawings. Note that the present invention is not limited to the embodiments.

First Embodiment

Figure 1:
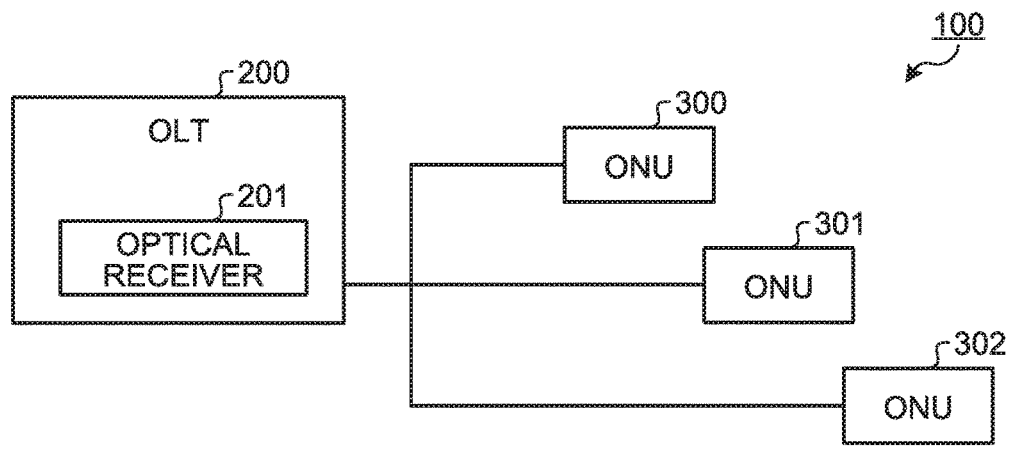
FIG. 1 is a diagram illustrating an example of a configuration of an optical communication system according to a first embodiment.

FIG. 1 is a diagram illustrating an example of a configuration of an optical communication system 100 according to the first embodiment of the present invention. The optical communication system 100 includes an OLT 200, and ONUs 300, 301, and 302. The OLT 200 is connected with the ONUs 300 to 302 via transmission paths or specifically optical star couplers and optical fibers. While the number of ONUs is three in FIG. 1, this is an example, and the number of ONUs is not limited thereto. The OLT 200, which is an optical terminal, includes an optical receiver 201. In the OLT 200, the optical receiver 201 performs: an operation of switching lower cut-off frequency, which will be described later, which achieves good high-frequency characteristics with which the quality of signal waveforms is not degraded; and achieves both high-speed burst reception characteristics and high consecutive identical digit immunity in reception of optical signals from the ONUs 300 to 302 located at different distances.

Figure 2:
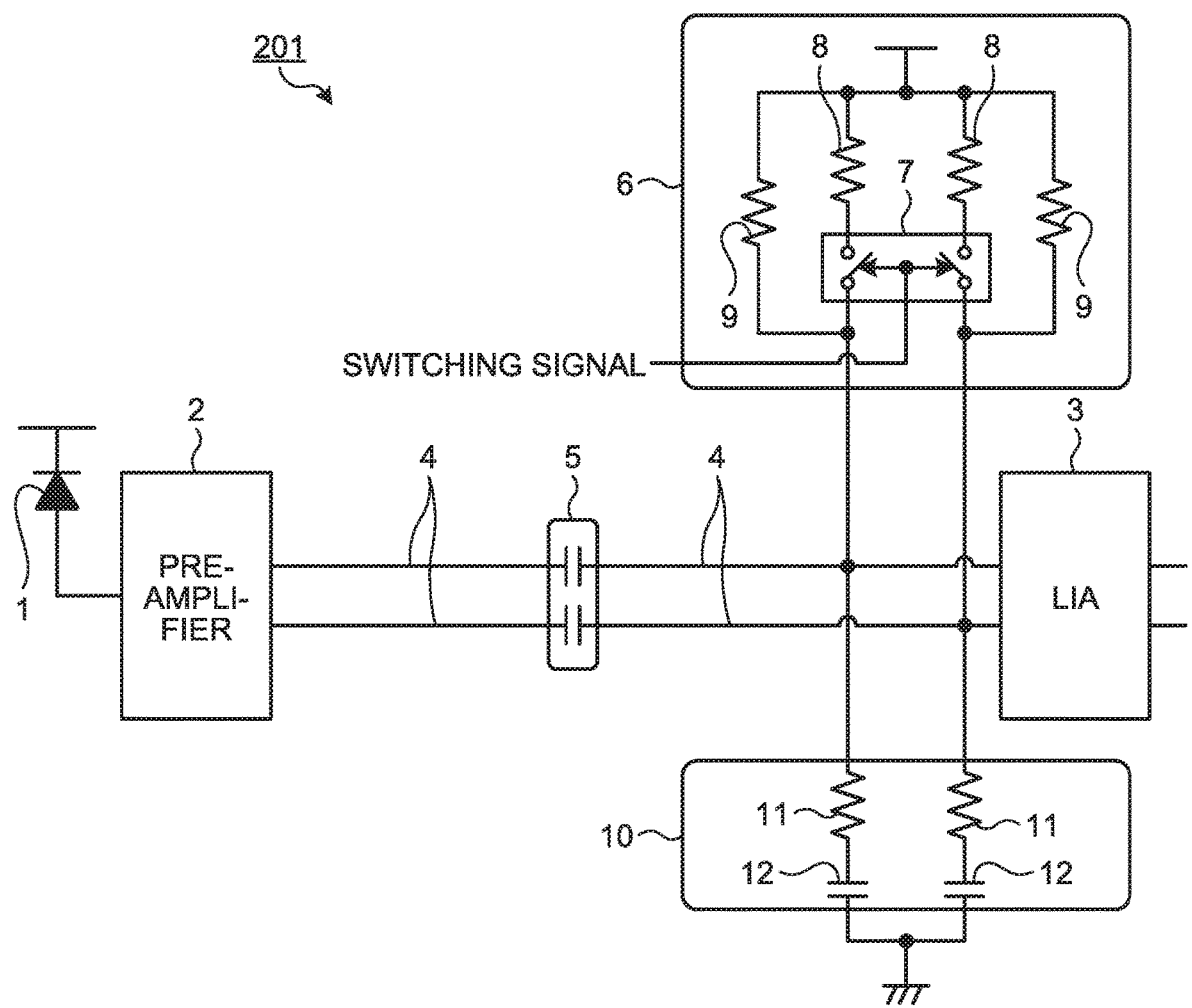
FIG. 2 is a block diagram illustrating an example of a configuration of an optical receiver according to the first embodiment.

The optical receiver 201 is mounted on the OLT 200, and receives optical signals from the ONUs 300 to 302 that constitute the optical communication system 100 together with the OLT 200. The configuration and operation of the optical receiver 201 will be described. FIG. 2 is a block diagram illustrating an example of the configuration of the optical receiver 201 according to the first embodiment. The optical receiver 201 includes: a light receiving element 1; a pre-amplifier 2; an amplitude limiting amplifier (limiting amplifier; hereinafter referred to as an LIA) 3; transmission lines 4; alternating current (AC) coupling capacitors 5; a termination circuit 6; and an AC load 10. The termination circuit 6 includes: a switch 7; two low termination resistors 8; and two high termination resistors 9. The AC load 10 includes two resistors 11 and two capacitors 12. In the optical receiver 201, the termination circuit 6 and the AC load 10 are electrically connected with each other in parallel.

The light receiving element 1 converts optical signals received from the ONUS 300 to 302 into current signals. The pre-amplifier 2 converts current signals output from the light receiving element 1 into voltage signals. The pre-amplifier 2 outputs the voltage signals to the transmission lines 4. In the first embodiment, the output impedance of the pre-amplifier 2 is 50Ω, for example. The LIA 3 is a limiting amplifier that amplifies and limits the amplitude of a voltage signal to a constant amplitude.

The transmission lines 4 connect the pre-amplifier 2 and the LIA 3 with each other. In the first embodiment, the characteristic impedance of the transmission lines 4 is adjusted to 50Ω, for example. The AC coupling capacitors 5 are capacitors inserted in the middle of the transmission lines 4 or at ends of the transmission lines 4. While the AC coupling capacitors 5 are inserted in the middle of the transmission lines 4 in the example of FIG. 2, this is an example, and the AC coupling capacitors 5 may be inserted at ends of the transmission lines 4. The ends of the transmission lines 4 are before the LIA 3, for example. According to the AC coupling method, the AC coupling capacitors 5 in the optical receiver 201 remove DC voltage components of voltage signals output from the pre-amplifier 2, and reset the DC voltages to that determined at the input of the LIA 3 to enable the LIA 3 to accurately reproduce signals. The AC coupling capacitors 5 may also be referred to as alternating current coupling capacitors.

The termination circuit 6 is a resistor connected with the transmission lines 4, for impedance matching on the transmission lines 4, so that voltage signals output from the pre-amplifier 2 are transmitted to the LIA 3 without loss due to reflection and the like. The switch 7 is a switch included in the termination circuit 6, and switches between on and off in accordance with a switching signal from outside. While one switch is illustrated in FIG. 2, this is an example, and a switch may be independently provided for each of the low termination resistors 8. The low termination resistors 8 are resistors included in the termination circuit 6, and connected in series with the switch 7 between an input terminal of the LIA 3 and a power supply terminal or a GND (hereinafter referred to as ground) terminal. The high termination resistors 9 are resistors included in the termination circuit 6, and connected in parallel with the switch 7 and the low termination resistors 8. The high termination resistors 9 are resistors with resistances higher than those of the low termination resistors 8.

The AC load 10 is an alternating current load connected with the transmission lines 4, and connected between the input terminal of the LIA 3 and the ground terminal or the power supply terminal, for impedance matching. The AC load 10 is open in a low-frequency range of a voltage signal, and has a resistance enabling impedance matching with the pre-amplifier 2 and the transmission lines 4 in a high-frequency range of a voltage signal. The resistors 11 are resistors included in the AC load 10, enabling, in the first embodiment, impedance matching with the output impedance of the pre-amplifier 2 and the characteristic impedance of the transmission lines 4, and having a resistance of 50Ω. The capacitors 12 are capacitors included in the AC load 10 and connected in series with the resistors 11. The capacitors 12 are open or have a high impedance in the low-frequency range of a voltage signal. In the AC load 10, as illustrated in FIG. 2, the resistors 11 and the capacitors 12 are connected in series, and respective ends of the circuit constituted by the resistors 11 and the capacitors 12 connected in series are connected with respective input terminals of the LIA 3.

In the optical receiver 201, for transmitting voltage signals on the order of 10 Gbps to subsequent circuits without degrading the quality of waveforms of the voltage signals, impedance matching: among the transmission side, that is, the output impedance of the pre-amplifier 2, the characteristic impedance of the transmission lines 4; and impedance matching of the reception side, that is, the input impedance of the LIA 3 needs to be performed so as to prevent loss due to reflection and the like. At present, for the characteristic impedance of the transmission lines 4, a 50-Ω system is widely used. Thus, in the optical receiver 201, the output impedance of the transmission side and the input impedance of the reception side are also adjusted to 50Ω, like the transmission lines 4.

Note that, in the optical receiver 201, the AC coupling capacitors 5, the termination circuit 6, and the AC load 10 constitute a high-pass filter. The lower cut-off frequency of the high-pass filter is "$1/(2\pi \times$capacitance of the AC coupling capacitors 5$\times$resistances of the termination circuit 6 and the AC load 10)". The lower cut-off frequency is one of causes of the trade-off between the burst reception characteristics and the consecutive identical digit immunity.

Note that the configuration of the optical receiver 201 illustrated in FIG. 2 is an example, and the configuration is not limited thereto. While the termination circuit 6 and the AC load 10 are external to the LIA 3, part or all of the termination circuit 6 and the AC load 10 may be included in the LIA 3. In addition, while the AC coupling capacitors 5 are arranged in the middle of the transmission lines 4, the AC coupling capacitors 5 may be arranged at ends of the transmission lines 4 as described above. In addition, while the output impedance of the pre-amplifier 2, the characteristic impedance of the transmission lines 4, and the resistors 11 included in the AC load 10 are set to 50Ω, these are an example for impedance matching, and specific resistances are not limited thereto. While the termination circuit 6 and the AC load 10 are each connected between a transmission line 4 and the power supply terminal or the ground terminal, the connections are one example and are not limited thereto.

Figure 3:
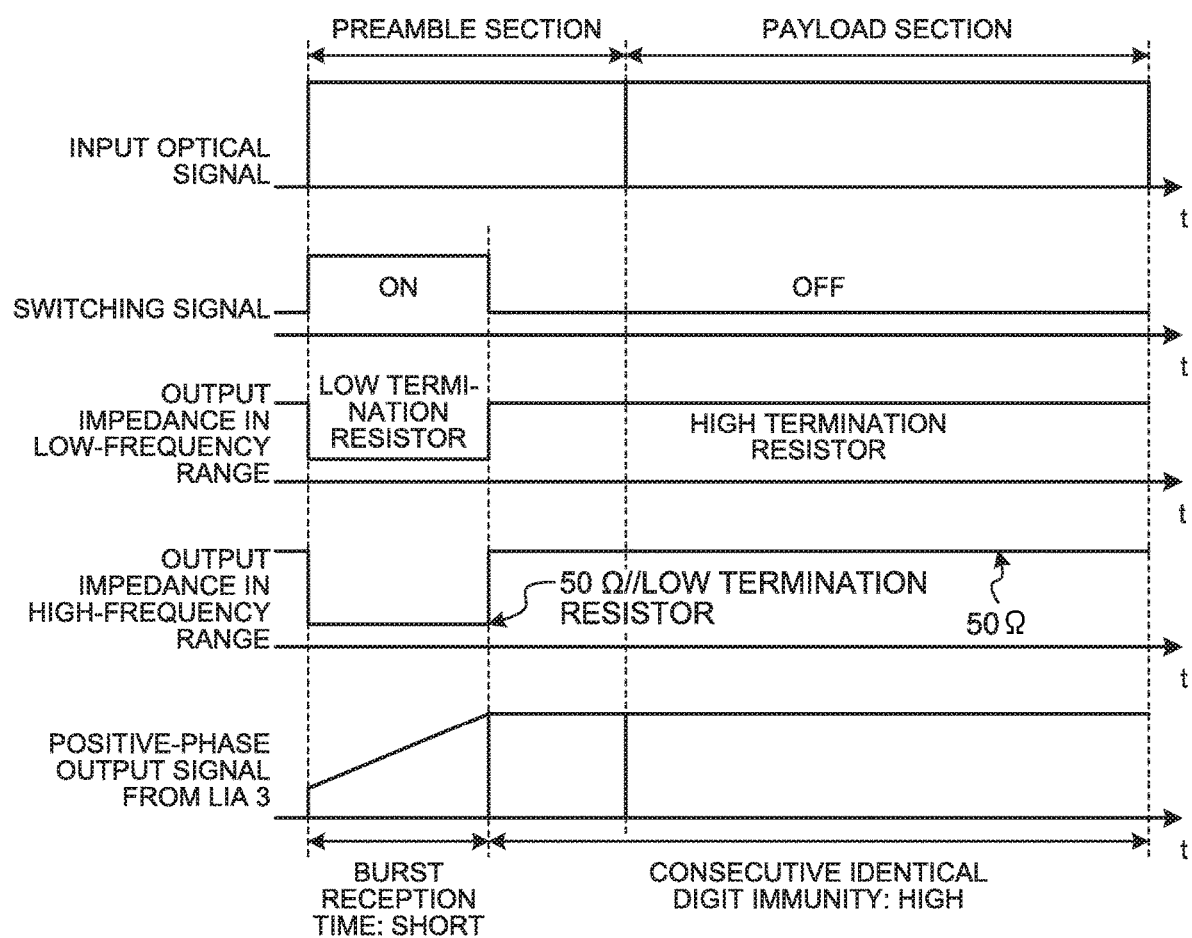
FIG. 3 is a timing chart illustrating operation of the optical receiver according to the first embodiment.

Next, operation of the optical receiver 201 will be explained. FIG. 3 is a timing chart illustrating operation of the optical receiver 201 according to the first embodiment. In FIG. 3: the first row illustrates an input optical signal input as an optical signal to the light receiving element 1; the second row illustrates a switching signal for controlling on and off of the switch 7; the third row illustrates the output impedance in the low-frequency range of a voltage signal output from the pre-amplifier 2; the fourth row illustrates the output impedance in the high-frequency range of the voltage signal output from the pre-amplifier 2; and the fifth row illustrates a positive-phase output signal of differential signals output from the LIA 3. In addition, in FIG. 3, the horizontal axis represents time.

First, during the leading portion of an input optical signal, that is, during a burst reception time within the preamble section from the start of reception of the input optical signal, the switch 7 receives a switching signal and is thus turned on. As a result, in the termination circuit 6, the low termination resistors 8 and the high termination resistors 9 are connected in parallel. At this point, the resistance of the AC load 10 is a high resistance because the capacitors 12 are open and the impedance is seen as being very high in the low-frequency range of a voltage signal output from the pre-amplifier 2. Thus, in the optical receiver 201, the output impedance in the low-frequency range is parallel connection of the low termination resistors 8 and the high termination resistors 9. In the optical receiver 201, in a case where the resistance of the high termination resistors 9 is sufficiently higher, such as about 100 times higher, than that of the low termination resistors 8, the resistance of the low termination resistors 8 becomes the main resistance, which is a low resistance. As a result, in the optical receiver 201, the lower cut-off frequency of the high-pass filter determined by the AC coupling capacitors 5 and the output impedance is a high value, which achieves high-speed burst reception characteristics, that is, a short burst reception time. The burst reception time is a time until the influence of direct current (DC) voltage variation of a voltage signal output from the pre-amplifier 2 is eliminated by the AC coupling capacitors 5 when the voltage signal is reproduced by the LIA 3. The burst reception time is dependent on the lower cut-off frequency of the high-pass filter.

In contrast, in the high-frequency range of the voltage signal output from the pre-amplifier 2, the impedance of the capacitors 12 is very low, which is substantially short circuited, and the resistance of the AC load 10 is 50Ω, which is the resistance of the resistors 11. Thus, in the optical receiver 201, the output impedance in the high-frequency range can be obtained from the resistors 11 of 50Ω and the low termination resistors 8, which are connected in parallel. In the optical receiver 201, because of impedance mismatching in the high-frequency range, the signal waveform quality is degraded. This is, however, of the signal in the preamble section, which is not a problem in the optical receiver 201. The resistance of the termination circuit 6 when the switch 7 is on will be referred to as a first resistance.

Subsequently, in the burst reception time, in a state in which the LIA 3 can accurately reproduce the signal, the switch 7 receives a switching signal and is thus turned off. As a result, in the termination circuit 6, the low termination resistors 8 is open, and only the high termination resistors 9 are connected with the transmission lines 4.

Thus, in the optical receiver 201, the output impedance in the low-frequency range of the voltage signal output from the pre-amplifier 2 is mainly the resistance of the high termination resistors 9, which is a high resistance. As a result, in the optical receiver 201, the lower cut-off frequency of the high-pass filter determined by the AC coupling capacitors 5 and the output impedance has a low value, which achieves high consecutive identical digit immunity.

In contrast, in the optical receiver 201, the output impedance in the high-frequency range of the voltage signal output from the pre-amplifier 2 can be obtained from the resistors 11 of 50Ω and the high termination resistors 9, which are connected in parallel, and is substantially 50Ω. As a result, in the optical receiver 201, impedance matching in the high-frequency range is enabled, and good waveform quality is achieved. The resistance of the termination circuit 6 when the switch 7 is off will be referred to as a second resistance. Note that the relation of the first resistance and the second resistance is first resistance<second resistance.

While the switch 7 is on when the switching signal is at the high level and the switch 7 is off when the switching signal is at the low level in FIG. 3, this is an example, and the switch 7 is not limited thereto. The combinations of the high level and the low level and on and off are not limited thereto as long as the switch 7 can be switched as intended.

Note that, in the optical receiver 201, the switch 7 is switched on by a switching signal at the timing after completion of reception of the payload section of a previous input optical signal or when reception of the preamble section of a current input optical signal is started. In addition, in the optical receiver 201, the switch 7 is switched off by a switching signal after being switched on, from the burst reception time and before reception of the payload section of the current input optical signal is started.

The optical receiver 201 may have a configuration in which switching signals are input from outside as long as the switch 7 is controlled to be switched on and off at the timings described above. For example, a control board or the like of the OLT 200 on which the optical receiver 201 is mounted may generate a switching signal, and the control board of the OLT 200 may output the switching signal to the optical receiver 201.

Alternatively, a switching signal may be generated inside the optical receiver 201 as long as control for switching at the timings described above can be performed. For example, the optical receiver 201 may generate a switching signal on the basis of a signal detect (SD) signal or a loss-of-signal (LOS) signal generated in the inside thereof, which is not illustrated in FIG. 2, and is not limited thereto. As described above, the switching signals may be generated in the outside of the optical receiver 201 or in the inside of the optical receiver 201.

As described above, according to the first embodiment, the optical receiver 201: electrically connects the transmission lines 4 with the termination circuit 6 and the AC load 10 in parallel; switches the resistance of the termination circuit 6 to the first resistance in the preamble section of an input optical signal; and switches the resistance of the termination circuit 6 to the second resistance, which is higher than the first resistance, in the payload section of the input optical signal. As a result, the optical receiver 201 achieves good burst reception characteristics in the preamble section of an input optical signal, and achieves good consecutive identical digit immunity in the payload section of the input optical signal while preventing degradation in the signal waveform quality. As described above, the optical receiver 201 achieves both of high-speed burst reception characteristics and high consecutive identical digit immunity while preventing degradation in the quality of signal waveforms.

Second Embodiment

In a second embodiment, a case where the configuration of the AC load is different from that of the first embodiment will be described.

Figure 4:
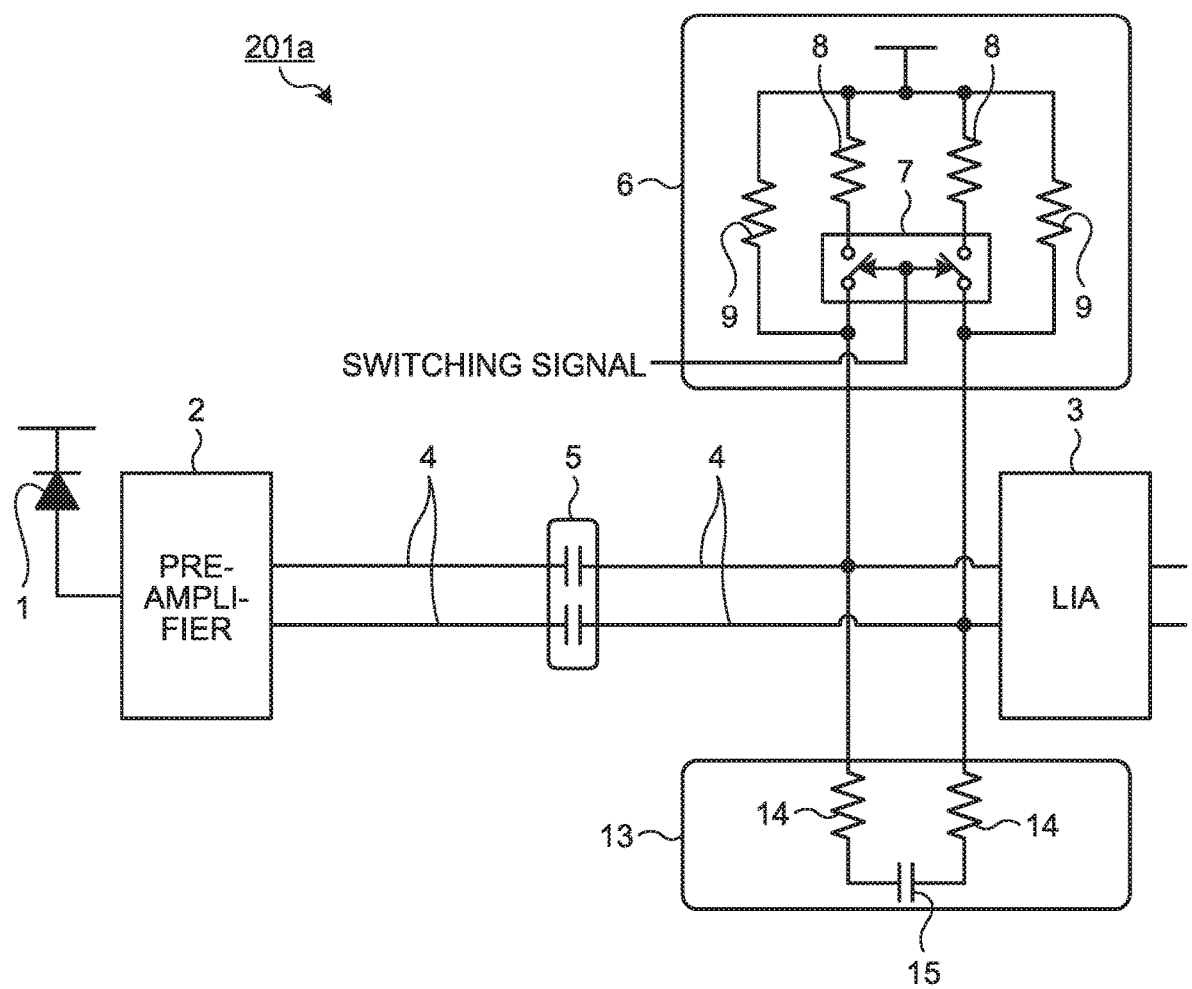
FIG. 4 is a block diagram illustrating an example of a configuration of an optical receiver according to a second embodiment.

FIG. 4 is a block diagram illustrating an example of the configuration of an optical receiver 201a according to the second embodiment. The optical receiver 201a is different from the optical receiver 201 in that the AC load 10 is replaced with an AC load 13. Although not illustrated, the OLT 200 can include the optical receiver 201a instead of the optical receiver 201 illustrated in FIG. 1.

The AC load 13 is an alternating current load connected between the input terminal of the LIA 3 and the ground terminal or the power supply terminal, for impedance matching. Resistors 14 are resistors included in the AC load 13, enabling impedance matching of the output impedance of the pre-amplifier 2 and the characteristic impedance of the transmission lines 4, connected with transmission lines 4 for differential signals, and having a resistance of 50Ω. A capacitor 15 is a capacitor included in the AC load 13, and inserted between the two resistors 14. The capacitor 15 is open or has a high impedance in the low-frequency range of a voltage signal. In the AC load 13, as illustrated in FIG. 4, the resistors 14 and the capacitor 15 are connected in series, and respective ends of the circuit constituted by the resistors 14 and the capacitor 15 are connected with the respective input terminals of the LIA 3.

With such a configuration, in the AC load 13, the capacitor 15 is open in the low-frequency range and seen as being short circuited in the high-frequency range. Furthermore, the AC load 13 is 100Ω between differential signals in the high-frequency range, and can thus perform impedance matching. As described above, the optical receiver 201a can operate in a manner similar to the optical receiver 201 of the first embodiment, and produces effects similar to those of the optical receiver 201.

Note that the configuration of the optical receiver 201a illustrated in FIG. 4 is an example, and the configuration is not limited thereto. While the resistance of the resistors 14 is 50Ω, this is an example for impedance matching with the output impedance of the pre-amplifier 2 and the characteristic impedance of the transmission lines 4, and the resistance is not limited thereto. In addition, while two resistors 14 and one capacitor 15 constitute the AC load 13 in the optical receiver 201a, this is an example, and the optical receiver 201a is not limited thereto. In the optical receiver 201a, one resistor of 100Ω may be connected in series between two capacitors to constitute the AC load 13, or one resistor of 100Ω and one capacitor may be connected in series to constitute the AC load 13, for example.

The configurations presented in the embodiments above are examples of the present invention, and can be combined with other known technologies or can be partly omitted or modified without departing from the scope of the present invention.

REFERENCE SIGNS LIST 1 light receiving element; 2 pre-amplifier; 3 LIA 4 transmission line; 5 AC coupling capacitor; 6 termination circuit; 7 switch; 8 low termination resistor; 9 high termination resistor; 10, 13 AC load; 11, resistor; 12, 15 capacitor; 100 optical communication system; 200 OLT 201, 201a optical receiver; 300 to 302 ONU.

The invention claimed is:

1. An optical receiver comprising:
a pre-amplifier to convert a current signal, into which an input optical signal is converted, into a voltage signal;
a limiting amplifier to amplify and limit an amplitude of the voltage signal;
a transmission line connecting the pre-amplifier with the limiting amplifier;
an alternating current coupling capacitor inserted in a middle of the transmission line or at an end of the transmission line;
a termination circuit connected with the transmission line, to switch to a first resistance or to a second resistance higher than the first resistance in response to a switching signal; and
an alternating current load connected with the transmission line, the alternating current load being open in a first-frequency range of the voltage signal and having a resistance enabling impedance matching with the pre-amplifier and the transmission line in a second-frequency range of the voltage signal, wherein
the termination circuit and the alternating current load are electrically connected in parallel, and
the second-frequency range of the voltage signal is higher than the first-frequency range of the voltage signal.

2. The optical receiver according to claim 1, wherein the termination circuit includes:
a switch to switch between on and off in response to the switching signal;
a first termination resistor connected in series with the switch between an input terminal of the limiting amplifier and a power supply terminal or a ground terminal; and
a second termination resistor connected in parallel with the switch and the first termination resistor and having a resistance higher than that of the first termination resistor, and
the termination circuit switches to the first resistance after reception of the input optical signal is started until a burst reception time when influence of variation in direct current voltage of the voltage signal on reproduction of the voltage signal at the limiting amplifier is eliminated, and switches to the second resistance after the burst reception time.

3. The optical receiver according to claim 2, wherein
the switching signal is generated in an outside or inside of the optical receiver, and
the switch is switched on in response to the switching signal at a timing after completion of reception of a payload section of a previous input optical signal or when reception of a preamble section of the current input optical signal is started, and the switch is switched off, after being switched on, in response to the switching signal from the burst reception time until reception of a payload section of the current input optical signal is started.

4. The optical receiver according to claim 1, wherein the alternating current load includes:
one or more resistors capable of impedance matching with an output impedance of the pre-amplifier; and
one or more capacitors being open or having an impedance in the first frequency range of the voltage signal, wherein the resistors and the capacitors are connected in series, and respective ends are connected with respective input terminals of the limiting amplifier.

5. An optical terminal comprising the optical receiver according to claim 1.

6. An optical communication system comprising the optical terminal according to claim 5.

7. The optical receiver according to claim 2, wherein the alternating current load includes:
one or more resistors capable of impedance matching with an output impedance of the pre-amplifier; and
one or more capacitors being open or having an impedance in the first-frequency range of the voltage signal, wherein
the resistors and the capacitors are connected in series; and respective ends are connected with respective input terminals of the limiting amplifier.

8. The optical receiver according to claim 3, wherein the alternating current load includes:
one or more resistors capable of impedance matching with an output impedance of the pre-amplifier; and
one or more capacitors being open or having an impedance in the first-frequency range of the voltage signal, wherein
the resistors and the capacitors are connected in series; and respective ends are connected with respective input terminals of the limiting amplifier.

9. An optical terminal comprising the optical receiver according to claim 2.

10. An optical terminal comprising the optical receiver according to claim 3.

11. An optical terminal comprising the optical receiver according to claim 4.

12. An optical terminal comprising the optical receiver according to claim 7.

13. An optical terminal comprising the optical receiver according to claim 8.

14. An optical communication system comprising the optical terminal according to claim 9.

15. An optical communication system comprising the optical terminal according to claim 10.

16. An optical communication system comprising the optical terminal according to claim 11.

17. An optical communication system comprising the optical terminal according to claim 12.

18. An optical communication system comprising the optical terminal according to claim 13.

\* \* \* \* \*